Figure 1:
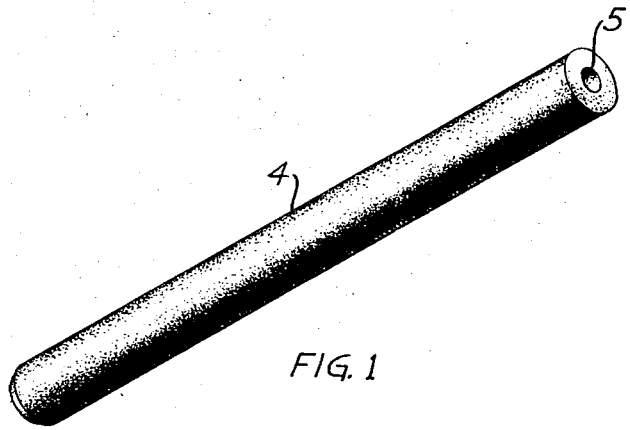

Oct. 12, 1954  E. HEDIGER  2,691,605

SILICON CARBIDE ARTICLES AND METHOD OF MANUFACTURING SAME

Filed Sept. 15, 1950

INVENTOR.
ERNST HEDIGER
BY W. F. Poley
ATTORNEY

Patented Oct. 12, 1954

2,691,605

UNITED STATES PATENT OFFICE 2,691,605

SILICON CARBIDE ARTICLES AND METHOD OF MANUFACTURING SAME

Ernst Hediger, Youngstown, N. Y., assignor to The Carborundum Company, Niagara Falls, N. Y., a corporation of Delaware Application September 15, 1950, Serial No. 185,014

10 Claims. (Cl. 117—62)

1

This invention relates to silicon carbide articles and to a method of manufacturing the same. More particularly it relates to silicon carbide articles having a porous body structure in which the silicon carbide is formed in the article by a process of siliconizing a suitable carbon body and subsequently removing at least a portion of the interstitial silicon.

Bonded silicon carbide articles have been made for years by conventional molding methods using granular silicon carbide which has been made previously in the usual manner and crushed to the desired grit size.

Generally speaking, two methods have been employed heretofore for making silicon carbide articles from previously created silicon carbide granules. One of these methods has included the use of a binding material such as clays, sodium silicate or the like. When it has been desired that such articles be of a porous body structure the desired porosity has been obtained through the addition to the mixture from which the article is made of the required amount of pore-forming material which is later burned out during the firing of the article to secure the desired porous body structure. Another method that has been utilized in forming silicon carbide resistors and other articles has involved the recrystallization of the silicon carbide material. No extraneous bonding material is used in the recrystallization process but, on the other hand, the bonding of the crystals or grains to form a unitary structure is obtained by causing the silicon carbide material to become knit together through the vaporization and recrystallization of the previously formed silicon carbide granules. Silicon carbide bodies made by the recrystallization process are by the very nature of the process of fabrication both open and porous. The extremely high temperatures required for the making of such articles by recrystallization procedure renders the cost of making them unduly high.

More recently an extremely dense form of siliconized silicon carbide body has been developed and the process for making such dense silicon carbide bodies is fully described in U. S. Patent No. 2,431,326 to Albert H. Heyroth. According to that patent, the silicon carbide is formed in situ by subjecting a carbon body, in which at least a substantial part of the carbon forms a continuous skeletal structure, to the action of elemental silicon at a temperature well above the melting point of the silicon. The carbon reacts with the silicon to form silicon carbide of a cubic crystalline variety and the interstitial pore spaces of the article are substantially filled with elemental silicon or silicon-rich material to provide an extremely dense, substantially non-porous material in the form of an article of substantially the same size and shape as that of the original carbon body. Such dense bodies have been found to have relatively high electrical and thermal conductivities in combination with other properties which make the material highly valuable as, or in conjunction with, electrical resistance elements and equipment.

However, by the very nature of the process of forming such silicon carbide bodies as described in U. S. Patent No. 2,431,326, the resulting body structures are dense and substantially non-porous and for those reasons have not been found entirely satisfactory for some purposes. For example, when such dense bodies are subjected to sudden changes in temperature they tend to crack or break in one or more places and for that reason are not entirely suitable for use where the article is to be exposed to sudden fluctuations in temperature. In other instances where it is desired to have a porous body having the high thermal and/or electrical conductivities of the material it has been found impossible to fabricate the bodies of the desired porosity in accordance with the disclosure of the aforesaid patent since by the very nature of the process the silicon metal tends to substantially fill the interstitial pore spaces of the carbon body during the siliconizing process and if insufficient silicon is used to fill the pore spaces it has been found that conversion of the carbon to silicon carbide throughout the article is not uniform and complete.

I have discovered that silicon carbide bodies or articles of the type described in the aforesaid patent in which the body comprises a continuous but reticular network of silicon carbide of the cubic crystalline variety and containing interstitial silicon or silicon-rich material can be obtained with a porous body structure whereby the articles are extremely resistant to heat shock by a process in which the siliconized body is subjected, immediately following the step of siliconizing and before the siliconized article has cooled appreciably, to a stream of gas under pressure which is forced through the body of the article to remove a portion of the silicon or silicon-rich material present in the interstices between the network of silicon carbide and render the article porous. The passage of the gas under pressure through the hot body, in removing a portion of the silicon, provides a communicating pore system within the body of the article which usually amounts to around 20% by volume of the body. When air, oxygen or other oxidizing gas is used as the gaseous medium, in addition to forming the above-described intercommunicating structure of pores, it has been found that the pore walls are coated or glazed with a thin film of a high-silica glass. The low refractive index, which is less than 1.50, of this thin glaze on the pore surfaces indicates that this glaze is almost entirely a fused silica glass. The exterior surfaces of the article are also found to have a surface coating of the same glazing material although the glaze is of such extreme thinness that it does not impart a glossy appearance to the finished article and is normally not visible to the naked eye.

Figure 2:
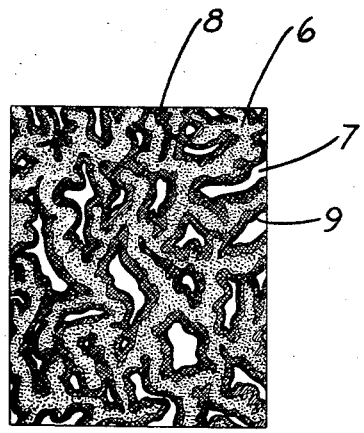

In order that the invention may be more clearly understood, reference is made to the drawings, in which:

Figure 1 is a perspective view of a closed end tube made in accordance with the present invention; and Figure 2 is a diagrammatic, greatly magnified view of a polished section of the porous body of an article made in accordance with the present invention.

Silicon carbide articles of porous body structure in which the body of the article comprises a continuous open network of silicon carbide of the cubic crystalline variety containing interstitial silicon and provided with a substantial volume of intercommunicating pore space can be made as follows.

The body containing carbon in a continuous skeletal formation can be made in several ways. It can be made by converting wood into charcoal, or by charring a body containing molasses, casein, dextrin, cereal flour, such as wheat flour, rye flour, or buckwheat flour, or other carbonizable materials. It can be made entirely of the skeletal form of carbon, but if desired it may include also additional finely divided carbon that does not form a part of such skeletal carbon structure.

The body containing carbon in a continuous skeletal formation can also be made by reacting certain kinds of carbonaceous liquid with a proper reagent whereby the carbonaceous liquid releases carbon in such a manner that it entirely fills the container with a porous skeletal form of carbon. Not all carbonaceous liquids are suitable for this purpose; in most of them the carbon when released is precipitated as a sludge which sinks to the bottom of the residue liquid. A carbonaceous liquid admirably suited for the purpose of making bodies of the desired form of carbon is furfural or some of its derivatives such as, for example, furfuryl alcohol. Mixtures of furfural and furfuryl alcohol may also be employed. Many of the mineral acids will release the carbon from the furfural compounds, among them being hydrochloric and sulphuric acids.

When hydrochloric acid or sulphuric acid is mixed with furfural, the liberation of carbon commences at once but proceeds slowly to completion in a period ranging from 10 minutes or less to many hours, depending upon the ratio of the acid content to the furfural. This feature conveniently allows adequate time for mixing, stirring, and pouring before the congealing action has progressed beyond the "ink" stage.

When furfuryl alcohol or a mixture of furfural and furfuryl alcohol is employed and mixed with acid, the reaction proceeds in the same manner but at a faster rate. With furfuryl alcohol alone it is very rapid. When a mixture of furfural and furfuryl alcohol is used, the reaction is still faster than when furfural alone is employed, the speed of reaction in this case depending on the ratio of furfuryl alcohol to furfural. In this comparison of speed of reaction it is, of course, assumed that the ratio of the furfural compound or compounds to acid in the mixture is held constant.

The instant the furfural compound and the acid are stirred together, an "ink" is formed by simultaneous release of atomic carbon in every portion of the mix. Subsequent action proceeds somewhat more slowly and operates to increase the size of and to knit together the "ink" aggregates produced during the primary reaction. During this stage of the reaction the carbon appears to "grow," much as a tremendously accelerated vegetable growth might be expected to proceed. In this manner a self-supporting carbon structure occupying the total volume of the liquid is built up, so that when the action is complete the resultant product may be likened to a wet sponge of the desired shape in which the sponge is analogous to the carbon body and the wetness to the residue of hydrochloric acid and/or the furfural compound.

The wet carbon shape is dried at a temperature high enough to drive off all moisture and other volatile matter. The shrinkage during this step is uniform in all directions and relatively small, varying slightly for different mix ratios. By the reaction above described between furfural compounds and acids, bodies consisting of 100% carbon may be produced having any desired structure varying from one imperviously dense to one having such porosity that only 5% of the total volume is carbon and 95% is air. In general, density increases with an increase in the proportion of the furfural compound in the mix. To be suitable for siliconization by the method hereinafter described, the carbon body so produced must be relatively porous. Therefore in making carbon bodies for siliconization not more than 60% furfural compound to 40% HCl or $H_2SO_4$ of the concentrations given in Examples VIII and IX, respectively, is ordinarily employed.

Microscopic examinations of carbon bodies produced by the reaction of furfural compounds with an acid reveals that the carbon in them is present in a continuous skeletal form. Such carbon has a systematic cellular structure and appears very much like that made by converting wood into charcoal or like the carbonized molasses, casein, dextrin, and cereal flours in the bodies of Examples I-VI, inclusive, after such bodies are carbonized. Such carbon, that is, that resulting from the reaction of furfural compounds and an acid, reacts in the same manner as those made by converting wood into charcoal or by charring a body containing a substantial amount of carbonizable material when it is subjected to the action of elemental silicon at a point well above the melting point of the silicon.

Carbon bodies made by the reaction of furfural compounds and an acid may include various other materials which modify the properties of either the carbon body or of the siliconized body resulting from siliconizing such body in the manner set out below. These materials are added to the mixture of the furfural compound and the acid employed. In the case of added solid materials, such as finely divided carbon, the particles are sufficiently small in size to remain suspended in substantially uniform distribution throughout the mixture until the carbon from the furfural develops sufficiently to hold them in place. Modifying liquids, such as glycerine, may be added to the mixture to add toughness to the resulting carbon shape so that it can be handled with ordinary care without danger of breakage.

The range of materials suitable for carrying out the present invention is very large and therefore it is not possible to give specific examples of all the possible combinations of materials that can be used. A few examples are here given for illustrative purposes. Examples I to VI, inclusive, illustrate the forming of the carbon body primarily from initially solid materials.

EXAMPLE I

*A mix suitable for ramming or tamping to shape*

Dry mix:

| | Per cent by weight |
|---|---|
| Sawdust | 20 |
| Grain flour, e. g. wheat flour | 10 |
| Finely divided carbon, e. g. lamp black | 70 |

The above materials are thoroughly mixed dry and then combined with molasses and water in the following proportions:

| | Per cent by weight |
|---|---|
| The above dry mix | 65–70 |
| Molasses | 25 |
| Water | 10–5 |

EXAMPLE II

*A mix suitable for extruding*

| | Per cent by weight |
|---|---|
| Grain flour, e. g. wheat flour | 13 |
| Carbon, e. g. lamp black | 62 |
| Water | 25 |

This mixture forms a dough suitable for extruding and, if desired, a small quantity of glycerine may be added in order to provide a lubricant for the extrusion.

EXAMPLE III

*A mixture suitable for rolling into sheets*

| | Per cent by weight |
|---|---|
| Grain flour, e. g. wheat flour | 27 |
| Carbon, e. g. lamp black | 45 |
| Casein glue containing approximately 15% casein | 28 |

EXAMPLE IV

*A mix suitable for tamping*

| | Per cent by weight |
|---|---|
| Carbon, e. g. lamp black | 29 |
| Charcoal, e. g. 20 mesh | 29 |
| Grain flour, e. g. wheat flour | 11 |
| Casein glue containing approximately 15% casein | 31 |

EXAMPLE V

*An extra flexible mix for extruding and forming into curved pieces*

| | Per cent by weight |
|---|---|
| Graphite, e. g. flake graphite | 28 |
| Grain flour, e. g. wheat flour | 22 |
| Charcoal, e. g. through 50 or 70 mesh | 10 |
| Casein glue containing approximately 15% casein | 40 |

EXAMPLE VI

*A mix suitable for extruding straight pieces*

| | Per cent by weight |
|---|---|
| Carbon, e. g. lamp black | 26 |
| Charcoal, e. g. 30–40 mesh | 26 |
| Grain flour, e. g. wheat flour | 17 |
| Casein glue containing approximately 15% casein | 31 |

Other materials that may be incorporated in the mixes in Examples I to VI, inclusive, either as partial or entire substitutes for the above materials, are wood flour, linseed oil, or animal glue as carbonizable materials and pulverized charcoal or pulverized coke as finely divided carbon.

The mixture containing the carbonizable material such as cereal flour, casein or glue is formed into a body of the desired shape and then dried. When dry, it is ready for carbonization and siliconization, which steps may be carried out separately or simultaneously, followed by the pore-forming operation.

The body may be carbonized as a separate step by being placed in an oven and heated to such temperature that the carbonizable material becomes completely charred and all volatile materials are driven off. As above indicated, the body need not, however, be carbonized as a separate step. The heating of the body during the reaction of the body and the metallic silicon in the methods of siliconizing the body set out below will accomplish the results of charring the carbonizable material and driving off the volatile matter in the body. It is therefore to be understood that the methods of siliconizing set out below are equally applicable whether or not the body containing carbonizable material has been preliminarily carbonized.

Examples VII, VIII, and IX give typical procedures in the formation of a carbon body by the reaction of a furfural compound and an acid; the examples are illustrative only and numerous variations are possible.

EXAMPLE VII

A carbon body suitable for siliconizing and rendering porous is made by stirring together:

| | Cc. |
|---|---|
| Furfural | 40 |
| Commercial hydrochloric acid | 60 |

Such mixture is then poured into a mold having a cavity of the shape of the desired carbon body. Reaction between the furfural and the hydrochloric acid to form the carbon structure filling the mold is completed after several hours. The wet carbon body is then removed from the mold and is ready for calcining, but may be stored for any length of time prior to calcining. The calcining step consists of heating the body in a neutral atmosphere at a temperature high enough to drive off all moisture and other volatile matter. A temperature of 1200° F. has been found sufficient to accomplish such result. The carbon body is now ready for siliconizing, followed by the pore-forming treatment.

EXAMPLE VIII

Loadings of materials such as finely ground carbon or glycerine may be included in the mixture of the furfural compound and an acid for the purpose of obtaining modified characteristics therein. A typical mix of this character consists of:

| | | |
|---|---|---|
| Furfural | cc | 30 |
| Hydrochloric acid | cc | 70 |
| Finely ground carbon | grams | 35 |
| Glycerine | do | 30 |

To insure uniform distribution of the loading material in the mixture and, finally, the carbon body formed therefrom, the loading material, carbon and glycerine in this case, is first thoroughly mixed with either the furfural or the acid. The furfural and the acid are then stirred together and poured into a mold. The remainder of the procedure is the same as that in Example VII.

The furfural employed in Examples VII, VIII, and IX, is the ordinary commercial furfural. The concentration of the hydrochloric acid is not critical. In Examples VII and VIII, however, the hydrochloric acid used was ordinary commercial concentrated hydrochloric acid containing about 35% HCl. Glycerine renders the carbon body less delicate and less apt to be broken upon normal handling.

As has been stated above, instead of furfural, furfuryl alcohol may be used in this and similar reactions. In general, for slow setting mixes, furfural alone is used. When furfuryl alcohol alone is used, the reaction is very rapid and hard to control and the acid must be used in the dilute concentrations. For rapid setting mixes, a mixture of furfural and 4% furfuryl alcohol has been found to work very well. However, any desired proportion of furfuryl alcohol may be used with furfural to obtain the desired result.

EXAMPLE IX

Sulphuric acid may be employed to release carbon from furfural, furfuryl alcohol or mixtures thereof. A typical example of the use of sulphuric acid in such reaction employs a mixture of:

|  | Cc. |
|---|---|
| Furfural | 25 |
| Dilute sulphuric acid | 75 |

A loading of 20 grams of finely divided carbon.

The sulphuric acid employed consists of 60% water and 40% commercial concentrated sulphuric acid by volume. The mix is poured into a mold and the setting, drying, siliconizing, and pore-forming procedure outlined in Examples VII and VIII is followed thereafter.

As with hydrochloric acid, when reacted with sulphuric acid, furfural alone gives a slow setting mix. For rapid setting mixes, furfuryl alcohol or mixtures of furfural and furfuryl alcohol are employed.

The step of calcining the dried carbon body while commercially desirable, is not absolutely necessary since the heating upon siliconization will drive off the volatile matter from the body. It has been found best, however, to calcine the carbon body before siliconizing it, since otherwise the body is apt to be cracked by the rapid escape of the volatile matter upon siliconization.

One way of carrying out the carbonization and siliconization of the body comprises providing a mass of molten silicon slightly greater in amount than that required to completely siliconize the body and, while further heating the said silicon mass, carefully laying the body on the surface of molten silicon. Silicon that is just molten will not penetrate the body to any material extent, but as soon as the further heating of the silicon causes it to reach a critical temperature, the impregnation of the article by the silicon is almost instantaneous. Not only does the silicon rapidly penetrate and impregnate the whole body but it also reacts with the carbon to form silicon carbide.

Another mode of carrying out the siliconizing step of the present invention comprises forming a body of the desired shape from a mixture of the character given in the above examples and laying the body on a mass of granular elemental silicon at ordinary room temperature. Having placed the article in contact with crushed elemental silicon, the temperature of the article and the silicon is raised rapidly to the point where rapid impregnation of the article by the silicon takes place. The exact temperature at which such action takes place is difficult to fix definitely but the probable temperature can be given as being above 1800° C. and perhaps as high as 2500° C. or even 3000° C.

The heating of the carbon and the silicon by the above method from room temperature to the critical temperature, well above the melting point of silicon, at which rapid impregnation of the carbon by the silicon takes place, may theoretically be conducted at any desired rate. Practically, because the porous form of carbon to be siliconized is easily reactive and because the process in this example is carried out in the atmosphere, the heating must be conducted at a rapid rate to prevent the carbon body from burning up.

The time for such impregnation is only a matter of seconds, and the entire heating time need not exceed from thirty seconds to one minute. The time varies according to the character of electrical equipment used and the rate of application of current. In general a heating period of from three to five minutes is sufficient under any conditions that are suitable for carrying out the siliconization process.

When the proper temperature has been reached, the penetration of the article by the silicon is extremely rapid and as the amount of silicon in contact with the article is only slightly in excess of that required to completely fill the pores of the article, the time elapsing between the beginning of the impregnation and its completion will be a matter of seconds.

As soon as the carbon article has been siliconized as described above and before it has had an opportunity to drop appreciably in temperature it is subjected to a blast of air, oxygen or other gas under pressure whereby the air or other gas is forced through the body structure of the article while the interstitial silicon or silicon-rich material is still molten to a large degree. As the blast of air or other gas passes through the article under from 10 to 60 pounds, and usually about 30 pounds pressure a portion of the molten silicon is forced out of the body of the article so as to form a system of intercommunicating pores throughout the body of the article. When air or other oxidizing gas is used, in addition to forcing a substantial amount of the interstitial silicon or silicon-rich material from the body of the article, the walls of the resulting pore structure are oxidized to form a thin protective film of a glaze which according to available analysis methods, appears to be substantially a vitreous or fused silica containing slight amounts of impurities, and which is elsewhere referred to herein as a high-silica glass or glaze The air or gaseous blowing operation takes place very quickly, requiring only a matter of a few seconds of time, and necessarily so since it is readily realized that the subjecting of the article to a blast of gas tends to rapidly cool the body of the article down to a point where the interstitial silicon is no longer molten and therefore could not be removed. As a matter of fact it is rather surprising that it is at all possible to force a passage of the air or other gas through the body structure of the article at the pressure used.

Referring further to the drawing, a closed end tube 4 of the type shown in Figure 1, 6" in length and having an outside diameter of ½" and bore 5 of ₁⁄₁₆" diameter, having a porous body structure, and made in accordance with the process herein described, was found to have a porosity of 18.0%, water absorption of 8.9% and an apparent density of 2.02. The porosity, water absorption and apparent density figures were determined in accordance with ASTM standard methods as reported under ASTM designation C20-41 and found on pages 278-280 of the 1942 Book of ASTM Standards, Part II, on "Non-Metallic Materials—Constructional."

Examination of the porous silicon carbide bodies made in accordance with the present invention shows that they comprise an open but continuous, three-dimensional network of silicon carbide with an interconnecting or intercommunicating pore structure throughout the article usually amounting to around 20% by volume of the body. The body furthermore contains a certain amount of residual free silicon which has not been removed during the air blowing operation but is substantially less in amount than that contained in a similar article which has not been subjected to the same air blowing procedure.

Examination of the body by X-ray diffraction methods shows that the silicon carbide has a pattern characteristic of a cubic material, in contra-distinction to the pattern of the usual kind of commercial silicon carbide, which is hexagonal or trigonal. The structure of the silicon carbide formation, moreover, is reticular, that is, the silicon carbide forms a substantially continuous network or skeletal structure throughout the article. Referring to Figure 2 which shows the body structure of an article made in accordance with the present invention in highly magnified diagrammatic form, the silicon carbide 6 is in the form of continuous open network with a plurality of interconnecting pore spaces 7 which are partially filled with a silicon or silicon-rich material 8, the surface of which is provided with a glassy film 9 of high-silica glass.

The porous silicon carbide bodies as herein made have been found to be highly resistant to both heat shock and oxidation at high temperatures. Consequently, the material is highly adapted to the making of articles required to meet such conditions. For example, porous, siliconized silicon carbide bodies of the herein described type are suitable for the fabrication of thermocouple protection tubes and other parts which are used in conjunction with the measurement of high temperatures and particularly for those parts such as thermocouple protection tubes which are required to be repeatedly introduced and withdrawn from molten metal baths. Under such conditions bodies of the same composition having a dense body structure fail to stand up under the heat shock and other conditions present in such operations.

However, it is not desired to restrict the present material to the above use as thermocouple protection tubes and parts or to any other specific application since other uses are apparent from a consideration of the properties and character of the material.

Having described the invention in detail, it is desired to claim:

1. An article of manufacture comprising a shaped porous body of crystalline silicon carbide of the cubic crystalline variety in the form of a continuous reticular network with intercommunicating pore spaces partially filled with silicon, the silicon in said pore spaces being coated with a vitreous silica glaze, the pore spaces of said body amounting to around 20% by volume of said body.

2. A porous article comprising a continuous but reticular network of silicon carbide of cubic crystalline form, the interstices within said article formed by the network of silicon carbide containing a substantial amount of silicon, the surface of which is coated with a thin film of a vitreous silica glaze, the pore spaces of said body amounting to around 20% by volume of said body.

3. A porous body composed of a continuous open network of silicon carbide of the cubic crystalline variety and interstitial silicon and in which the surface of the interstitial silicon is coated with a thin layer of a vitreous silica glaze, the pore spaces of said body amounting to around 20% by volume of said body.

4. A porous body composed of a continuous open network of silicon carbide of the cubic crystalline variety and interstitial silicon and in which the surface of the interstitial silicon and external surface of said body are coated with a thin layer of a vitreous silica glaze, the pore spaces of said body amounting to around 20% by volume of said body.

5. An article comprising silicon carbide of cubic crystalline variety in the form of a continuous open network with a plurality of interconnecting pore spaces which are partially filled with silicon the surface of which silicon is provided with a film of a vitreous silica glaze, said pore spaces amounting to around 20% by volume of said body.

6. A shaped porous body consisting essentially and throughout of crystalline silicon carbide of the cubic crystalline variety in the form of a continuous reticular network with intercommunicating pore spaces partially filled with silicon, the pores amounting to around 20% by volume of said body.

7. The method of making porous silicon carbide bodies comprising a continuous reticular network of silicon carbide of the cubic crystalline variety containing interstitial silicon material comprising forming a skeletal body of carbon of the desired shape, heating the skeletal carbon body in the presence of sufficient silicon to a temperature above 1800° C. to vaporize the silicon which reacts with the carbon of said body to form silicon carbide and deposit silicon interstitially thereof, and forcing a gas under sufficient pressure through the siliconized body while the interstitial silicon is still molten to a large degree to extract a substantial portion of the interstitial silicon therefrom.

8. The method of making porous silicon carbide bodies comprising a continuous reticular network of silicon carbide of the cubic crystalline variety containing interstitial silicon material and having the surface of the interstitial silicon glazed, comprising forming a skeletal body of carbon of the desired shape, heating the skeletal carbon body in the presence of sufficient silicon to a temperature above 1800° C. to vaporize the silicon which reacts with the carbon of said body to form silicon carbide and deposit silicon interstitially thereof, and forcing air under sufficient pressure through said siliconized body before it cools to the solidification temperature of the silicon to extract a substantial portion of the interstitial silicon and oxidize the surface of the residual silicon of the body to form a glaze thereon.

9. The method of making porous silicon carbide bodies comprising a continuous reticular network of silicon carbide of the cubic crystalline variety containing interstitial silicon material and having the surface of the interstitial silicon glazed, comprising forming a skeletal body of carbon of the desired shape, heating the skeletal carbon body in the presence of sufficient silicon to a temperature above 1800° C. to vaporize the silicon which reacts with the carbon of said body to form silicon carbide and deposit silicon interstitially thereof, and forcing oxygen under sufficient pressure through said siliconized body before it cools to the solidification temperature of the silicon to extract a substantial portion of the interstitial silicon and oxidize the surface of the residual silicon of the body to form a glaze thereon.

10. The method of making porous silicon carbide bodies comprising a continuous reticular network of silicon carbide of the cubic crystalline variety containing interstitial silicon material comprising forming a skeletal body of carbon of the desired shape, heating the skeletal carbon body in the presence of sufficient silicon to a temperature above the melting point of silicon in a relatively short time whereby rapid impregnation of the silicon into the pores of the body takes place which silicon reacts with the carbon of said body to form silicon carbide and deposit silicon interstitially thereof, and forcing a gas under sufficient pressure through the siliconized body while the interstitial silicon is still molten to a large degree to extract a substantial portion of the interstitial silicon therefrom.

References Cited in the file of this patent

UNITED STATES PATENTS

| Number | Name | Date |
|---|---|---|
| 772,262 | Tone | Oct. 11, 1904 |
| 836,353 | Acheson | Nov. 20, 1906 |
| 1,028,303 | Tone | June 4, 1912 |
| 1,528,351 | Walton | Mar. 3, 1925 |
| 1,609,937 | Forrest | Dec. 7, 1926 |
| 1,658,334 | Holmgreen | Feb. 7, 1928 |
| 1,906,963 | Heyroth | May 2, 1933 |
| 2,135,492 | Brennan | Nov. 8, 1938 |
| 2,303,080 | Hutchins et al. | Nov. 24, 1942 |
| 2,431,326 | Heyroth | Nov. 25, 1947 |
| 2,614,947 | Heyroth | Oct. 21, 1952 |